US009838125B2

(12) United States Patent
Prucnal et al.

(10) Patent No.: US 9,838,125 B2
(45) Date of Patent: Dec. 5, 2017

(54) MULTIBEAM RADIO FREQUENCY PHOTONIC BEAMFORMER USING A MULTI-SIGNAL SLOW LIGHT TIME DELAY UNIT

(71) Applicant: The Trustees of Princeton University, Princeton, NJ (US)

(72) Inventors: Paul Prucnal, Princeton, NJ (US); Matthew Chang, Princeton, NJ (US); John Chang, West Windsor, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 68 days.

(21) Appl. No.: 14/836,536

(22) Filed: Aug. 26, 2015

(65) Prior Publication Data
US 2017/0063461 A1  Mar. 2, 2017

Related U.S. Application Data

(60) Provisional application No. 62/041,746, filed on Aug. 26, 2014.

(51) Int. Cl.
*H04B 10/00* (2013.01)
*H04B 10/2575* (2013.01)
(Continued)

(52) U.S. Cl.
CPC ..... *H04B 10/25752* (2013.01); *H04B 7/0617* (2013.01); *H04B 10/1123* (2013.01)

(58) Field of Classification Search
CPC .. G02B 6/2861; H01Q 3/2682; H01Q 3/2676; G02F 2201/20
(Continued)

(56) References Cited

U.S. PATENT DOCUMENTS

| 8,170,384 B1 * | 5/2012 | Riza | G02B 6/2861 |
| | | | 385/27 |
| 8,400,355 B1 * | 3/2013 | Gaeta | H01Q 3/2682 |
| | | | 342/368 |

(Continued)

OTHER PUBLICATIONS

A F. Molisch. "Multiantenna Systems," in Wireless Communications, 2nd edition, Wiley, 2010. ch. 20.
(Continued)

*Primary Examiner* — Don N Vo
(74) *Attorney, Agent, or Firm* — Meagher Emanuel Laks Goldberg & Liao, LLP

(57) ABSTRACT

A photonic beamformer is disclosed andh is configured to transmit or receive a plurality of RF input signals from a plurality of antennas. The beamformer receiver includes a plurality of optical modulators, each optical modulator being configured to modulate each of the RF input signals onto an optical carrier, each carrier having a different wavelength. The beamformer receiver also includes a plurality of optical amplifiers, each optical amplifier being configured to vary the optical power of one optical carrier based on a weighting input and generate a weighted optical carrier. The beamformer receiver also includes a plurality of multi-beam optical true-time delays (TTD), each TTD being configured to receive all of the weighted optical carriers and generate a plurality time delayed optical carriers. The beamformer receiver also includes a plurality of detectors configured to detect each of the plurality time delayed optical carriers and generate an electrical signal that represents each of the plurality of received RF input signals.

14 Claims, 13 Drawing Sheets

(51) Int. Cl.
*H04B 10/112* (2013.01)
*H04B 7/06* (2006.01)

(58) Field of Classification Search
USPC .......................................................... 398/115
See application file for complete search history.

(56) References Cited

U.S. PATENT DOCUMENTS

2008/0063411 A1* 3/2008 Lekkas ............ H04B 10/25758
 398/187
2016/0054431 A1* 2/2016 Zou ......................... G01S 7/282
 342/372

OTHER PUBLICATIONS

"Phased Array Antennas." Harris Corp., Government Communications Systems Division, Melbourne, FL, 2004. http://www.photonics.com/Article.aspx?AID=19750.
Y. Liu, G. Burnham, G. Jin, and J. Zhao, "Wideband Multi-beam Photonics-based RF Beamformer" 2010 IEEE International Symposium on Phased Array Systems and Technology, pp. 581-585, Oct. 2010.
"Cisco Visual Networking Index: Global Mobile Data Traffic Forecast Update, 2013-2018," Cisco Systems. Inc. Feb. 5, 2014.
J. Yao,—A Tutorial onl Microwave Photonics IEEE Photon. Soc. News, vol. 26, No. 3, pp. 5-11, Jun. 2012.
J. Chang, M. P. Fok, R. M. Corey, J. Meister, P. R Prucnal, "Highly Scalable Adaptive Photonic Beamformer Using a Single Mode to Multimode Optical Combiner" IEEE Microw. Wireless Compon. Lett, vol. 23. No. 10, pp. 563-566, Oct. 2013.
H. Subbaraman, M. Y. Chen, and R. T. Chen, "Photonic Crystal Fiber-Based True-Time-Delay Beamformer for Multiple RF Beam Transmission and Reception of an X-Band Phased-Array Antenna," J. Lightwav. Technol., vol. 26, No. 15, pp. 2803-2810, Aug. 2008.
J. Capmany, B. Ortega, and D. Pastor. "A Tutorial on Microwave Photonic Filters" J. Lightwav. Technol., vol. 11, No. 4, pp. 201-229, Jan. 2006.
C. J. Chang-Hasnain. P.-C. Ku, J. Kim, and S. L. Chuang, "Variable optical buffer using slow light in semiconductor nanostructures," Proc. IEEE vol. 91, 1884-1897, 2003.
J. R Khurgin. "Slow light in various media: a tutorial," J. Lightw. Technol. vol. 24, pp. 201-229,2006.
M. S. Bigelow, N. N. Lepeshkin, and R. W. Boyd, "Observation of ultraslow light propagation in a ruby crystal at room temperature," IEEE Trans. Microw. Theory Techn. vol. 58, pp. 3022-3038, 2010.
L. W. Hillman, R. W. Boyd, J. Krasinski, and C. R Stroud Jr., "Obsevation of a spectral hole due to population oscillations in a homogeneously broadened optical absorption line," Optics Communications vol. 45. pp. 416-419 (1983).
M. Deruyck et al., "Model for power consumption of wireless access networks." IET Sci. Meas. Technol., vol. 5, pp. 155-161 (2011).
D. Liang, G. Roelkens, R. Baets, and J. E Bowers. Hybrid integrated platforms for silicon photonics. Matetials, 3(3):1782-1802, 2010.
G. Roelkens, J. Brouckaert, D. Van Thourhout, R. Baets. R. Nötzel, and M. Smit, Adhesive bonding of InP/InGaAsP dies to processed silicon-on-insulator wafers using DVS-bis-benzocyclobutene. Journal of the Electrochemical Society, 153( 12), 2006.

* cited by examiner

MULTIBEAM RADIO FREQUENCY PHOTONIC BEAMFORMER USING A MULTI-SIGNAL SLOW LIGHT TIME DELAY UNIT

CROSS-REFERENCE TO PRIOR FILED APPLICATIONS

This application claims the benefit of U.S. Provisional Application No. 62/041,746, filed Aug. 26, 2014, which is incorporated herein in its entirety.

TECHNICAL FIELD

The present disclosure generally relates to the field of beamforming spatial filtering and in more particular relates to photonic beamformers.

BACKGROUND OF THE INVENTION

Beamforming is the spatial steering of an antenna array pattern for directional transmission or reception. FIG. 1A is a basic pictorial diagram of a beamforming antenna array 12 configured for spatial steering of the antenna array pattern for directional transmission or reception. In this example, the system 10 also includes a plurality of user devices 14 in communication with the antenna array 12 and an interfering user 16. As shown in FIG. 1A, beamforming is used to lock onto and increase the signal-to-noise ratio (SNR) of desired links to the user devices 14, while simultaneously placing interferers 16 in nulls. Spatial steering uses no moving parts and is performed by weighting and delaying signals at each antenna element so that the resulting radiation pattern points in a specific direction because of constructive interference. FIG. 1B is a pictorial diagram of a basic beamforming antenna array and transceiver system 20. The system includes a beamforming antenna array 22, a transceiver 24 and an adaptive algorithm 26 that determines the angle of arrival and the appropriate delays. The output of the adaptive algorithm 26 is coupled to the beamforming antenna array 22 for generation of one or more steered beams 28. Multi-beam beamforming presents many additional exciting opportunities and benefits. From the point of view of space division multiple access (SDMA), N independent spatial beams theoretically result in an N-fold increase in network capacity. Alternatively, multiple beams allow for more flexible network management. For example, beams may be directed towards high priority users, such as emergency responders, while still providing network availability to normal users. In imaging, multi-beam beamforming opens the doors to real-time imaging and pattern recognition that is too difficult to realize with single-beam beamformers.

Electrical RF beamformers are commercially available but traditionally suffer from several issues related to bandwidth and scalability. The most well-known issue is beam-squint, where different frequency components are steered in slightly different directions because of the use of non-frequency flat RF components and phase shifters, which are inherently frequency sensitive. Beam-squint can cause unintended interference and unintentional fading of wideband signals; as a result, electrical beamformers are typically narrowband. Multi-beam electrical beamformers also exist, and the current state-of-the-art, which is used for military and satellite communications, achieves about ten simultaneous beams. However, the cost and size of such systems is often prohibitively large for civilian applications. Operating N simultaneous beams using electronics is typically performed by using N parallel and independent beamformer structures; in other words, the hardware for multi-beam electrical beamforming is not scalable.

Photonic beamformers arise as a natural remedy to the problems presented by electronics. Optics provides extremely wide bandwidths and is immune to electromagnetic interference. Photonic beamformers weight and delay signals in the optical domain, using variable optical attenuators and sub-picosecond precision optical true-time delays (TTDs). TTDs are extremely important because they eliminate the frequency-sensitive delay in electrical beamformers that is the source of beam-squint. The sub-picosecond precision also translates to high-resolution steering of the beam. Another advantage of photonics is the ability to seamlessly multiplex many signals together using wavelength division multiplexing (WDM), a technique unavailable to electronics. This is the key to scalable multi-beam photonic beamforming. Whereas a ten-beam electronic beamformer requires ten independent sets of cables and delays, a photonic structure needs only a single WDM-compatible TTD and ten wavelengths of light to multiplex. Currently, there are no multi-beam photonic commercial beamformers on the market. An improved multi-beam photonic beamformer is desirable.

BRIEF SUMMARY OF THE INVENTION

Disclosed herein is a photonic multi-beam RF beamformer configured to enable high throughput, scalable space division multiple access (SDMA), and to exploit a relatively untapped spectrum efficiency. The disclosed photonic beamformer is capable of steering multiple beams simultaneously, enabling unique capabilities such as multi-target tracking and dynamic SDMA to take full advantage of the capacity embedded in these spatial channels. The disclosed photonic beamformer has several advantages that result in superior performance compared to the state-of-the-art. For example, it leverages the benefits of optical signal processing, which translates to extremely broad bandwidth operation and immunity to electromagnetic interference. The architecture is highly scalable. By combining the mature wavelength division multiplexing (WDM) technology of the telecom industry with a novel, multi-beam, slow and fast light, true time delay device, the beamformer steers M beams by simply using M distinct wavelengths of light with minimal additional hardware. Compared to multi-beam electrical beamformers, which require M parallel, independent paths and hardware for M beams, the disclosed photonic beamformer exhibits significantly reduced cost, size, weight, and power (C-SWaP). The disclosed photonic beamformer is also semiconductor compatible and naturally lends itself to monolithic integration. The disclosed approach is suitable for manufacture of a multi-beam beamformer photonic integrated circuit (PIC) to realize scalable and robust beamforming.

A photonic beamformer configured to receive a plurality of RF input signals from a plurality of antennas is disclosed. The beamformer includes a plurality of optical modulators, each optical modulator being configured to modulate each of the RF input signals onto an optical carrier, each carrier having a different wavelength. The beamformer also includes a plurality of optical amplifiers, each optical amplifier being configured to vary the optical power of one optical carrier based on a weighting input and generate a weighted optical carrier. The beamformer also includes a plurality of multi-beam optical true-time delays (TTD), each TTD being configured to receive all of the weighted optical signals and generate a plurality of time delayed optical signals. The beamformer also includes a plurality of detectors configured to detect each of the plurality of time delayed optical carriers and generate an electrical signal that represents each of the plurality of received RF input signals.

At least one demultiplexer may be coupled between the optical modulators and the plurality of optical amplifiers to demultiplex the plurality of optical carriers into individual optical carriers. A signal processor may be configured for angle determination and weighting and delay determination coupled to the weighting input of each optical amplifier. The optical amplifiers may be semiconductor optical amplifiers (SOAs) configured to vary the optical power of one optical carrier based on a weighting input and generate a weighted optical carrier. The multi-beam optical TTDs may be semiconductor optical amplifiers (SOAs) configured to receive all of the weighted optical carriers and generate a plurality time delayed optical signals. At least one demultiplexer may be coupled between the multi-beam optical TTDs and the detectors to demultiplex the plurality of time delayed optical carriers into individual time delayed optical carriers.

A photonic beamformer configured to transmit a plurality of RF transmit signals from a plurality of antennas is also disclosed. The beamformer includes a plurality of optical modulators, each optical modulator being configured to modulate each of the RF input signals onto an optical carrier, each carrier having a different wavelength. The beamformer also includes a plurality of optical amplifiers, each optical amplifier being configured to vary the optical power of one optical carrier based on a weighting input and generate a weighted optical carrier. The beamformer also includes a plurality of multi-beam optical true-time delays (TTD), each TTD being configured to receive all of the weighted optical carriers and generate a plurality of time delayed optical signals. The beamformer also includes a plurality of detectors configured to detect each of the plurality of time delayed optical carriers and generate an electrical signal that represents each of the plurality of RF transmit signals.

At least one splitter may be coupled between the optical modulators and the plurality of optical amplifiers to split the plurality of optical carriers into individual optical carriers. A signal processor may be configured for angle determination and weighting and delay determination coupled to the weighting input of each optical amplifier. The optical amplifiers may be semiconductor optical amplifiers (SOAs) configured to vary the optical power of one optical carrier based on a weighting input and generate a weighted optical carrier. The multi-beam optical TTDs may be semiconductor optical amplifiers (SOAs) configured to receive all of the weighted optical carriers and generate a plurality time delayed optical carriers.

DETAILED DESCRIPTION

Figure 1A:
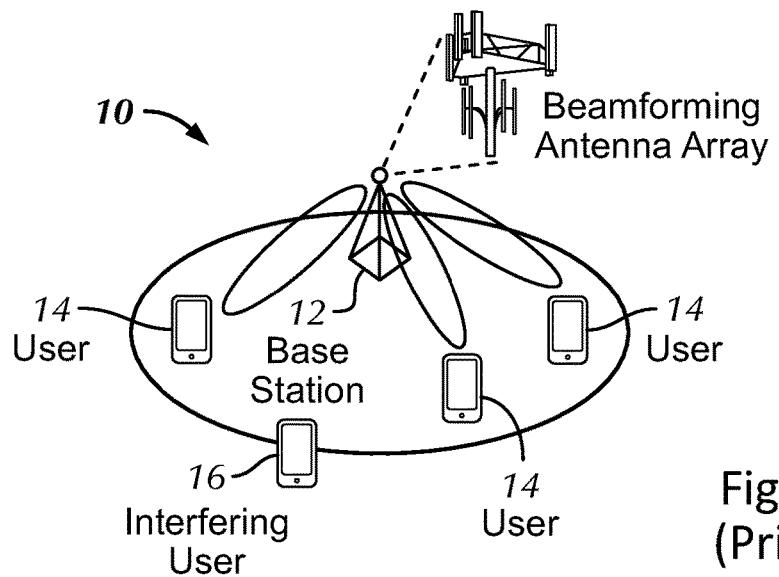
FIG. 1a is a basic pictorial diagram of a beamforming antenna array configured for spatial steering of the antenna array pattern for directional transmission or reception.
Figure 1B:
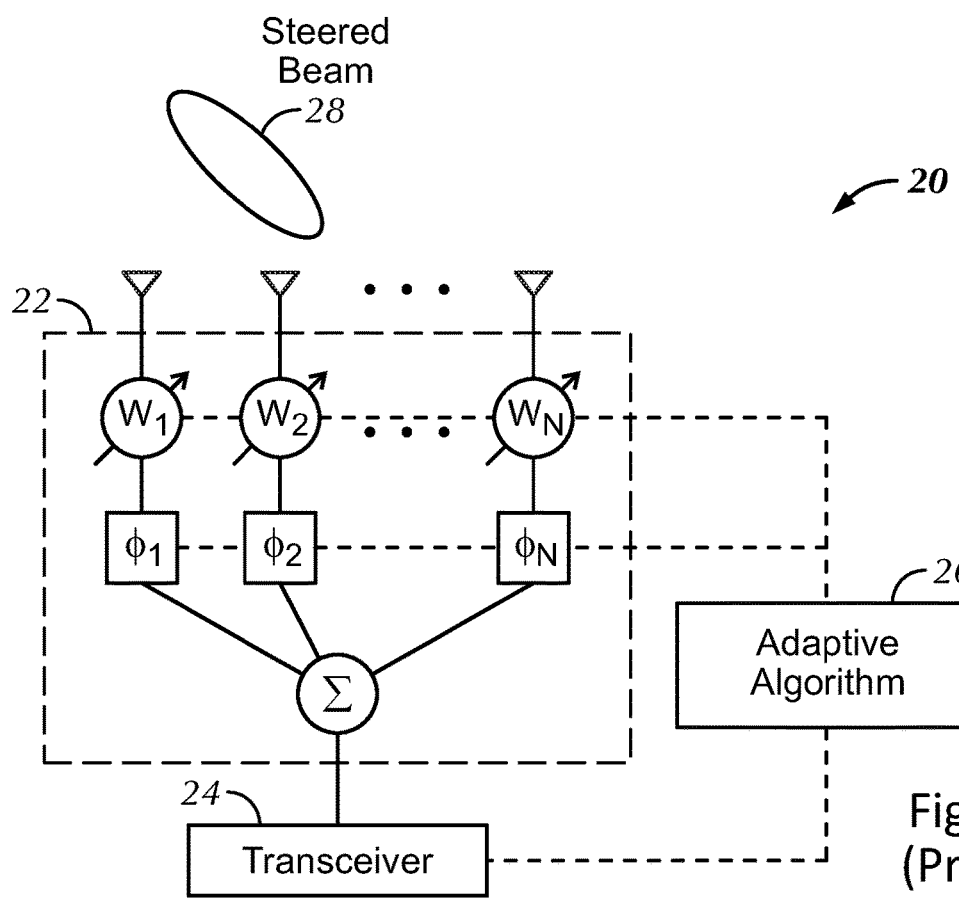
FIG. 1B is a pictorial diagram of a basic beamforming antenna array and transceiver system.
Figure 2A:
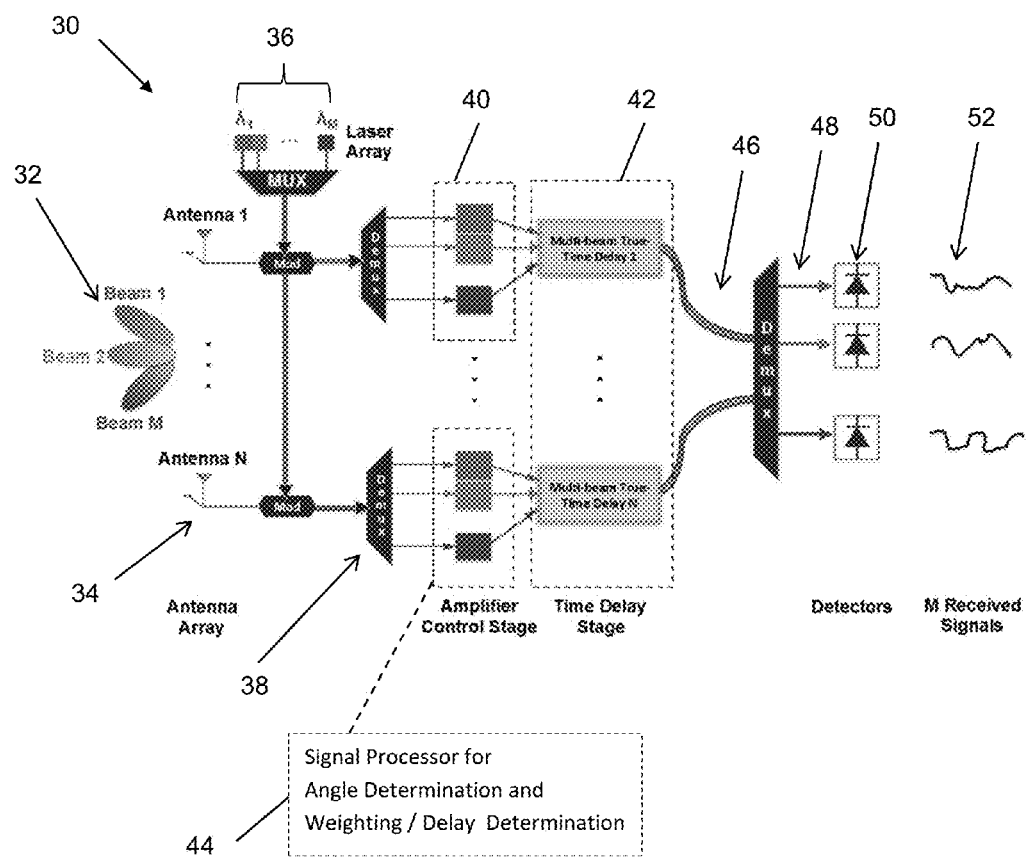
FIG. 2A is a block diagram of a beamformer architecture for a receive beamformer system.
Figure 2B:
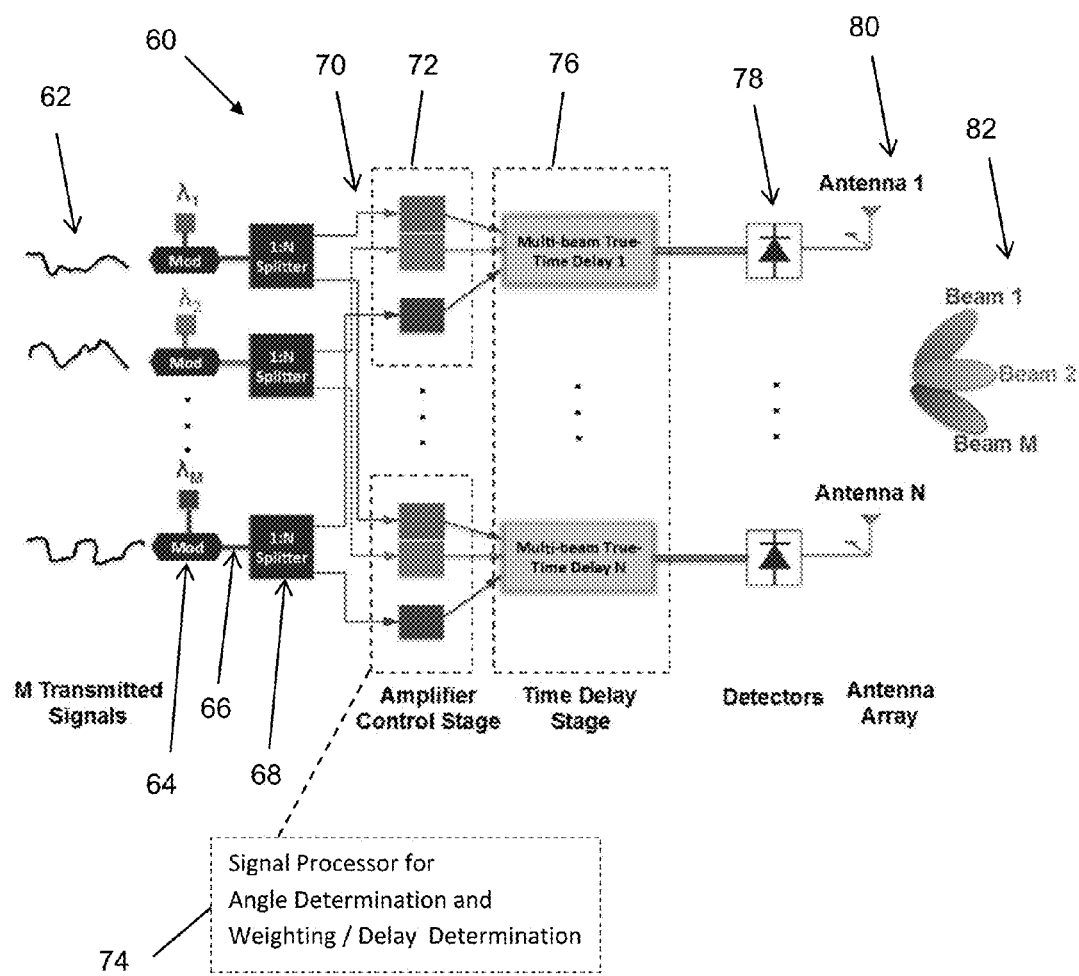
FIG. 2B is a block diagram of a beamformer architecture for a transmit beamformer system.

Disclosed herein is a beamformer architecture that uses a novel multi-beam slow and fast light based TTD, which independently delays multiple distinct wavelength signals in a single, compact device. The multi-beam TTD is an important aspect because it allows the beamformer to enjoy efficient parallel processing using WDM, fast (μs) steering, and semiconductor compatibility to pave the way for a cheap, scalable, and robust PIC beamformer. The full details of the device are set out below. FIG. 2A is a block diagram of a beamformer architecture for a receive beamformer system 30. FIG. 2B is a block diagram of a beamformer architecture for a transmit beamformer system 60. In the case of a receiver, M RF received signals 32 are detected by each of the N elements of the antenna array 34 at slightly different times because of the spacing between antenna elements. The N received RF signals each modulate an optical carrier, which is comprised of M distinct wavelengths 36 shown as $\lambda_1$-$\lambda_M$, where M represents the number of beams to be steered by the beamformer. The N modulated optical signals are each demultiplexed into their M wavelength components as shown generally by reference number 38, and each component is set to a specific control power by a stage of optical amplifiers 40 (one optical amplifier for each of the distinct wavelengths $\lambda_1$-$\lambda_M$). As described below with respect to the multi-beam TTD, the input optical power is used to control the time delay experienced by each signal. The delay is therefore fully electronically controlled and encoded in the input optical power of each signal. A signal processor 44 is configured to determine the angle of arrival and determine the proper weighting/delay for each of the N received RF signals 32. After the optical powers are set, the M wavelength components are multiplexed back together and passed into a multi-beam TTD 42 (one TTD for each antenna, each TTD receives multiple wavelengths of light, one for each received beam). The TTD 42, delays each of the M wavelength signals based on its optical power. The M wavelength components experience slightly different group velocities and leave the multi-beam TTD 42 with the different delays that are required to extract the signal arriving from a particular direction.

All the delayed optical signals 46 are then combined and subsequently demultiplexed into their M wavelength components 48, or beams. As a result, each beam 48 comprises an appropriately delayed contribution from each of the N antenna elements in order to steer the respective beam. The M wavelength signals are converted back into electrical signals by a detector 50, and represent the RF signals 52 received by each beam. Each beam can be independently steered by controlling the input optical power of each wavelength of light for all N antennas. The multi-beam TTD allows analog control, meaning that continuous steering is possible. Meaning the steering resolution is only limited by the precision of the control electronics.

The transmit beamformer 60 operates in a very similar fashion, with each wavelength representing a different beam. The operation of the architecture is illustrated in FIG. 2B. In the first step, each of the M signals to be transmitted 62 is modulated onto an optical carrier of a different wavelength as shown by reference number 64. Each modulated optical carrier 66 is then split into N equal components by splitter 68. Each component 70 each is weighted or set to a specific control power by a stage of optical amplifiers 72 (one optical amplifier for each of the distinct wavelengths $\lambda_1$-$\lambda_M$). A signal processor 74 is configured to determine the angle of arrival and determine the proper weighting/delay for each of the N RF signals to be transmitted 82. After the optical powers are set the weighted components are routed to a multi-beam TTD 76, which delays each wavelength component differently (selected control power). The output of the multi-beam TTD 76 contains appropriately delayed signals from each of the M transmit signals 62. The aggregate signal is converted back into an electrical signal via detectors 78 and broadcast from an antenna element 80. It should be understood that additional electrical and optical components may be used in a working system such as an RF amplifier stage coupled to the antenna to amplify the signal prior to transmission. These elements are omitted from the drawings for the purposes of clarity. Each of the N antennas 80 broadcasts a delayed contribution from the original M signals, thus forming M independent, steered beams 82.

A multi-beam TTD delays multiple signals independently and simultaneously. To effectively locate and track multiple targets and maintain high link quality for SDMA, the TTD must provide (1) μs scanning speeds and (2) sufficiently high delay range and resolution, while (3) minimizing crosstalk. Additionally, the TTD may be compatible with PIC technology so that it can be integrated into a PIC beamformer.

Disclosed herein is a multi-beam slow and fast light-based TTD that can meet the requirements stated above to enable a high performance beamformer. The TTD is based on the physics of slow and fast light in a semiconductor and therefore possesses highly desirable properties such as fast ps tuning, continuous tunability (i.e. continuous beam steering resolution), and WDM compatibility. Each wavelength channel's delay is controlled by the channel input optical power, resulting in full electronic control and fast ps tuning. The TTD is based on a semiconductor optical amplifier (SOA), and therefore exhibits full compatibility with standard PIC processing, while simultaneously capitalizing on the extensive R&D invested into the telecom industry.

Figure 3A:
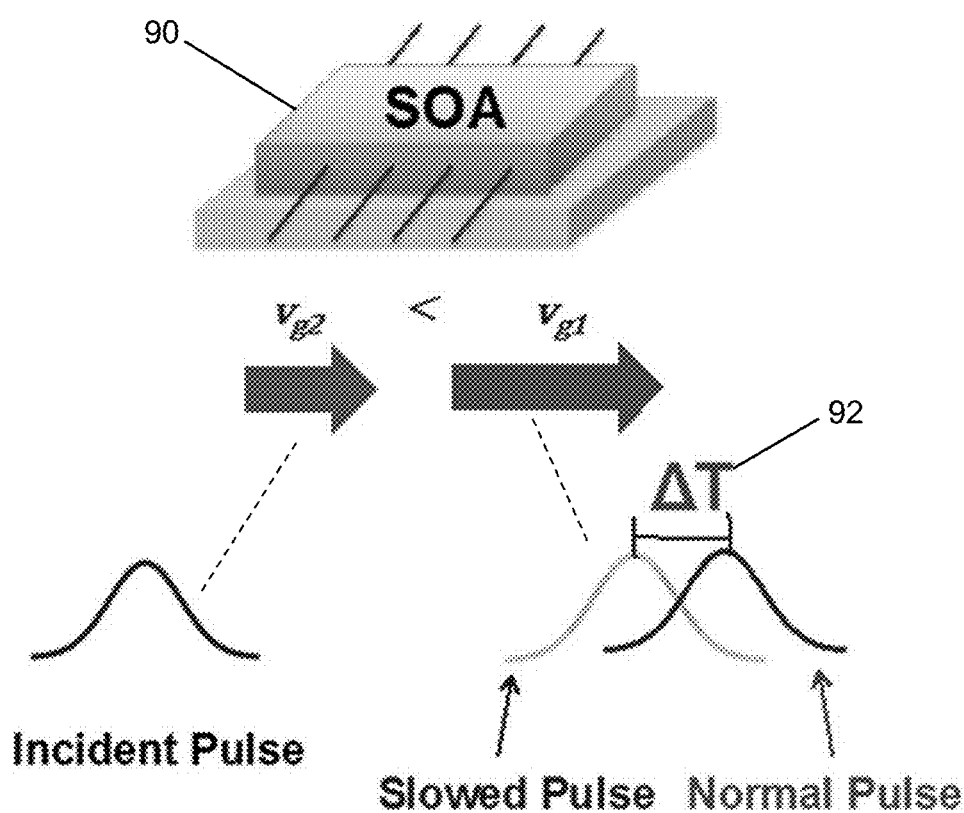
FIG. 3A is a pictorial diagram of a slow light based delay line that creates a delay by controlling the group velocity of light.

The multi-beam TTD uses the slow and fast light effect in an SOA, which has been thoroughly researched in the past decade because of its potential to realize a fast, controllable optical delay line. Slow and fast light refers to changing the group velocity of light within a propagating medium; if the group velocity is tunable, then so is the resulting optical delay at the output of the medium. FIG. 3A is a pictorial diagram of a slow light based delay line 90 that creates a delay 92 by controlling the group velocity of light. Group velocity is changed by engineering a dispersion in the propagating medium at a particular wavelength. The dispersion, in turn, is caused by a resonance via the Kramers-Kronig Relations. In semiconductors, such as an SOA, this resonance can be generated at any wavelength within the gain bandwidth of the semiconductor by a process known as Coherent Population Oscillations (CPO). In CPO, the beating between two optical signals induces oscillations in the carrier population between the valence and conduction bands at the beat frequency.

Figure 3B:
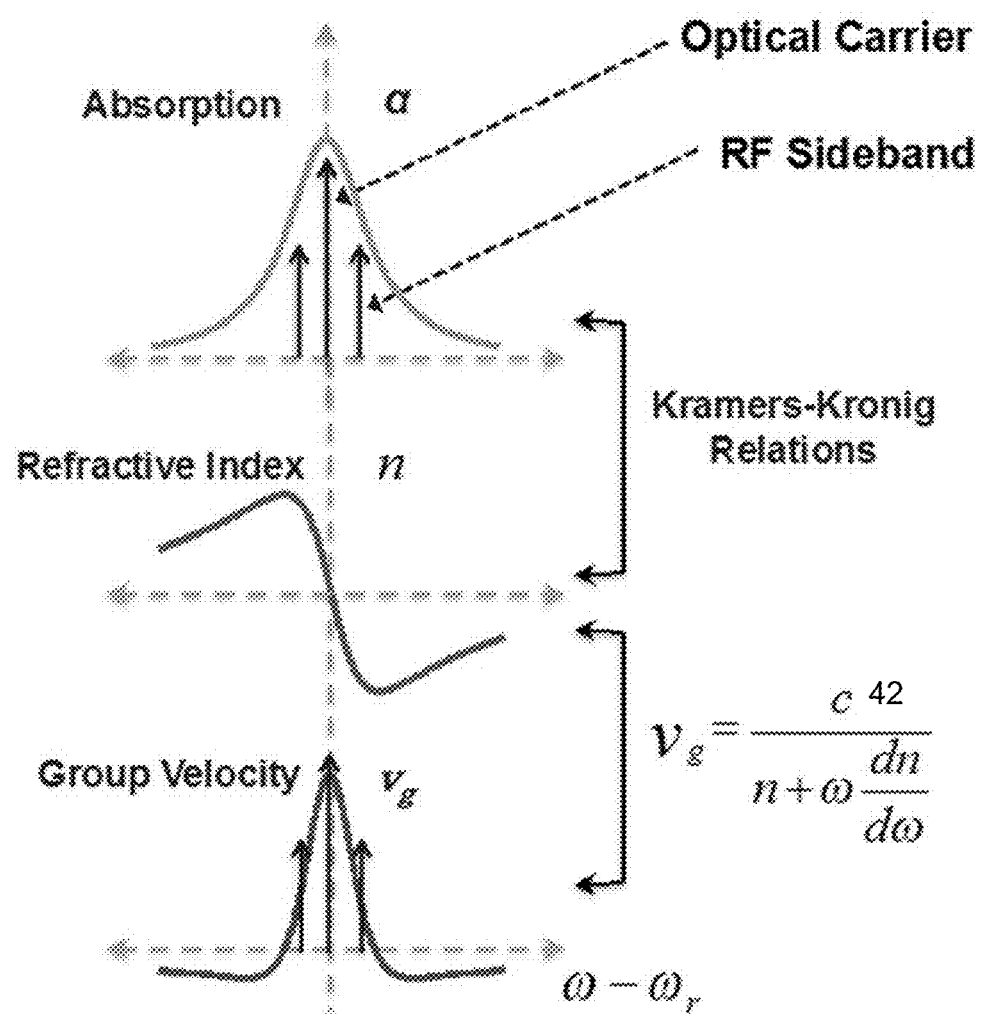
FIG. 3B includes graphs showing an optical carrier and its RF sidebands beat in a semiconductor to generate coherent population oscillations.

In RF photonics, an optical carrier and its RF sidebands conveniently play the roles of the two optical signals. Simply injecting an RF-modulated optical carrier into an SOA is sufficient to induce CPO and, consequently, slow and fast light. A visual interpretation of the physics of slow and fast light is shown in FIG. 3B. FIG. 3B includes graphs showing an optical carrier and its RF sidebands beating in a semiconductor to generate coherent population oscillations. The resulting absorption resonance induces a dispersion in the refractive index, which changes the group velocity of the semiconductor at the resonance frequency. It should be noted that for this scheme, fast light is generated (group velocity>background group velocity). Nevertheless, advances in time are referred to as time delays to remain consistent, acknowledging that only relative time differences matter.

The signal processing properties of slow and fast light, which directly follow from the physics, lead to key functionalities such as continuously tunable delay, ps tuning speeds, and wavelength division multiplexing (WDM). The maximum tuning range of a slow and fast light based delay line employing CPO is typically determined by the semiconductor carrier lifetime. Typical commercial semiconductor carrier lifetimes for SOAs fabricated from III-V semiconductors are on the order of hundreds of picoseconds. In the 2.6 GHz band (LTE), 100 ps correspond to about a 90-degree phase shift.

The delay is tuned by changing the group velocity and, consequently, the depth of the CPO-induced resonance. This is accomplished by controlling either (1) the input optical power or (2) the semiconductor bias current, which both modulate the population oscillations. For a multi-beam beamformer, which has multiple wavelength channels, one must use the input optical power of each wavelength as the delay control parameter, because changing the SOA bias current affects all wavelengths. Therefore, input optical power is used as the control parameter in the architecture presented in the previous section. By scanning the input optical power continuously through a wide enough range, the full continuum of delays can be accessed, theoretically yielding continuous scanning resolution for the multi-beam photonic beamformer.

The tuning speed of the multi-beam TTD is primarily dictated by the semiconductor carrier lifetime, because the carrier lifetime indicates how long it takes for oscillating charge carriers to react after the input optical power is changed. The time it takes for a change in optical power to reach the SOA from the source of change must also be added to the tuning time. Semiconductor carrier lifetimes are typically <1 ns, and, assuming a PIC no larger than a centimeter in any dimension, changes in optical power should take no more than 10 ps to reach the SOA. Thus, the physics of the process indicates that the tuning time of the TTD is on the order of 1 ns. In practice, the tuning will be dictated by the speed of the control electronics, on µs time scales.

Figure 4A:
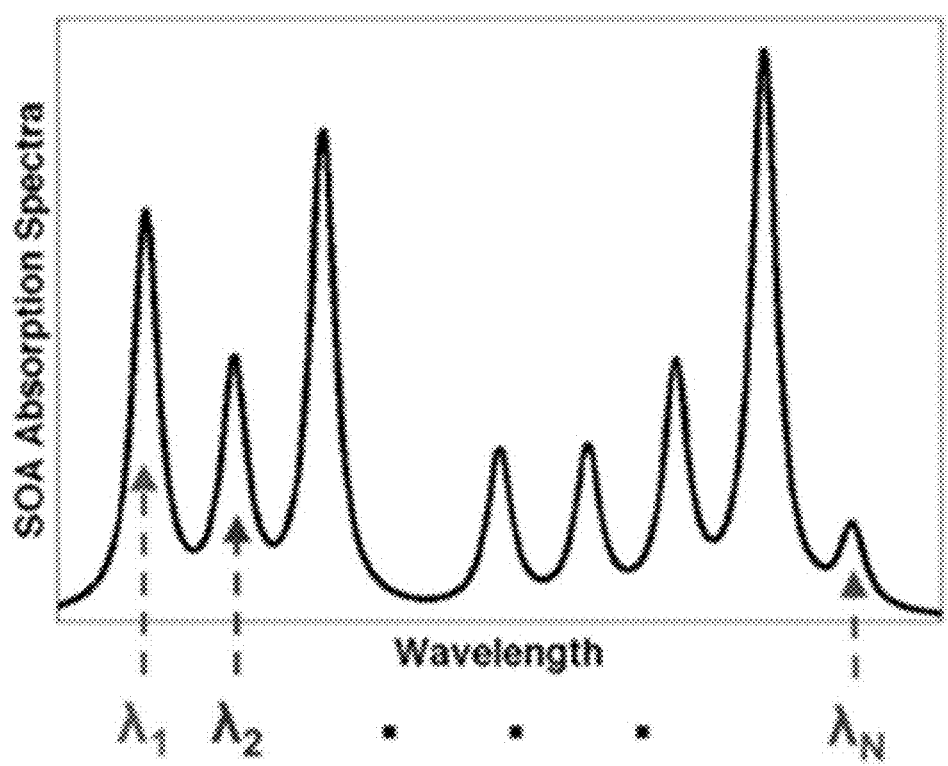
FIG. 4A is a graph showing an example operation of a multi-beam slow light delay line with N wavelength multiplexed signals that enter the SOA and induce different levels of CPO, based on their optical power.
Figure 4B:
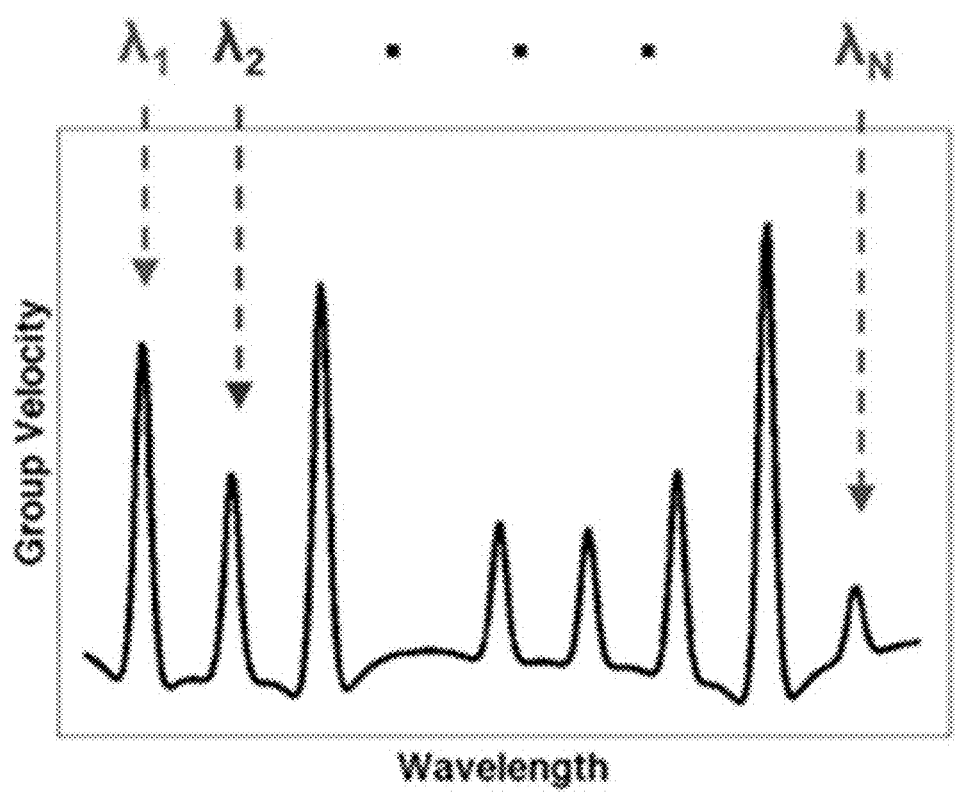
FIG. 4B is a graph showing an example where each wavelength that enter the SOA experiences a different group velocity.
Figure 4C:
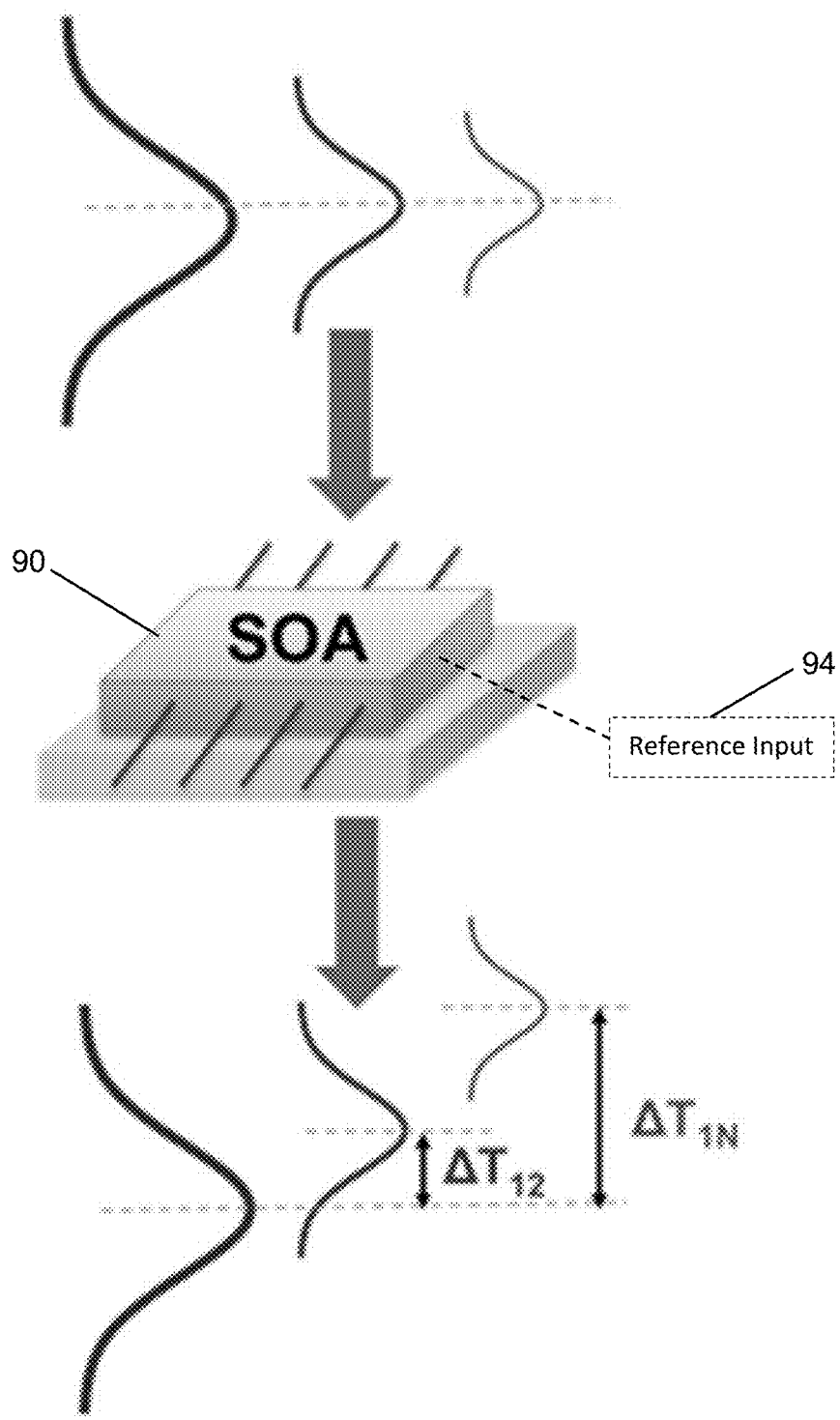
FIG. 4C is a schematic diagram showing how the multi-beam slow and fast light TTD processes multiple signals.

The ability to select exactly at what wavelength CPO occurs makes CPO-induced slow and fast light a natural candidate for WDM signal processing and is the key to enabling multi-beam signal processing. Multiple CPO resonances can be induced in a single SOA by using different wavelength optical carriers, each modulated by its own RF signal. Changing the input optical power of each wavelength (i.e. each channel) allows one to independently control the delay of each channel. FIG. 4A is a graph showing an example operation of a multi-beam slow light delay line with N wavelength multiplexed signals that enter the SOA and induce different levels of CPO, based on their optical power. FIG. 4B is a graph showing an example where each wavelength that enter the SOA experiences a different group velocity. To steer the multi-beam beamformer, the channels can be multiplexed, delayed independently in a single TTD, and then demultiplexed at the output for further processing or detection. Unlike other tunable delay technologies, the disclosed approach never requires a change in the wavelength of the optical sources. The necessary channel separation is only dictated by the width of the CPO resonances that induce slow light. These resonances need to be wider than the largest RF frequency they are delaying. For an LTE antenna, a channel separation of 50 GHz (ITU standard) should be more than sufficient to prevent crosstalk and interference. A schematic of how the multi-beam slow and fast light TTD processes multiple signals is shown in FIG. 4C.

Figure 5A:
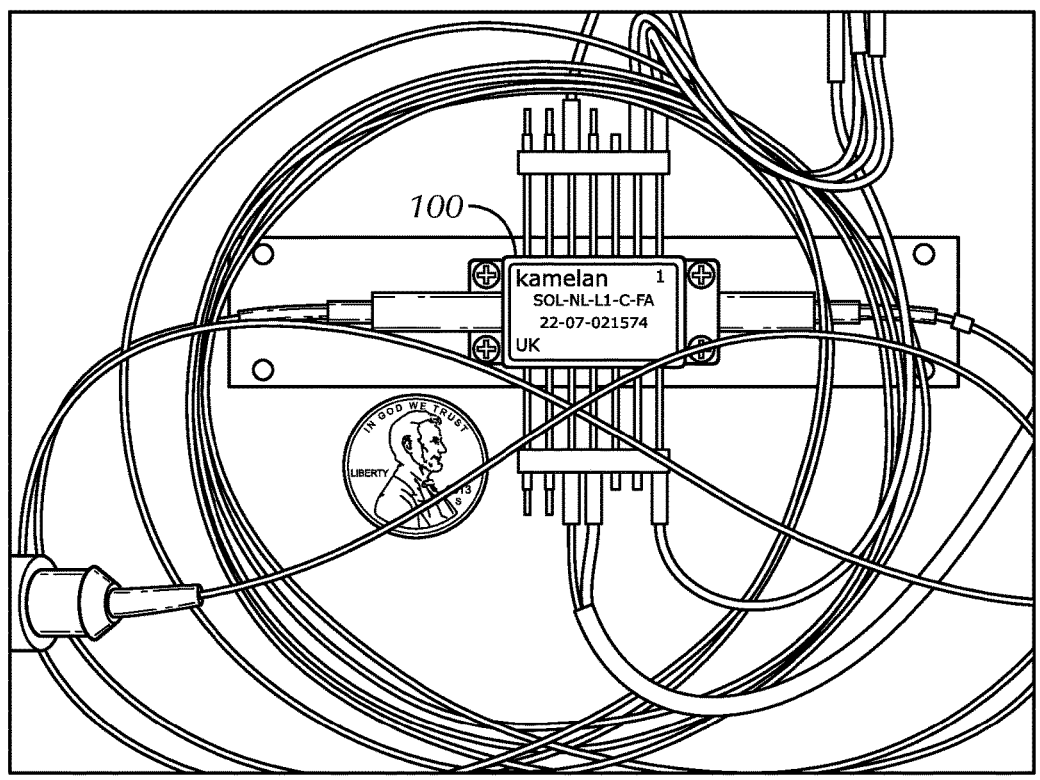
FIG. 5A shows an SOA chip used to a single-beam slow light TTD experiment.
Figure 5B:
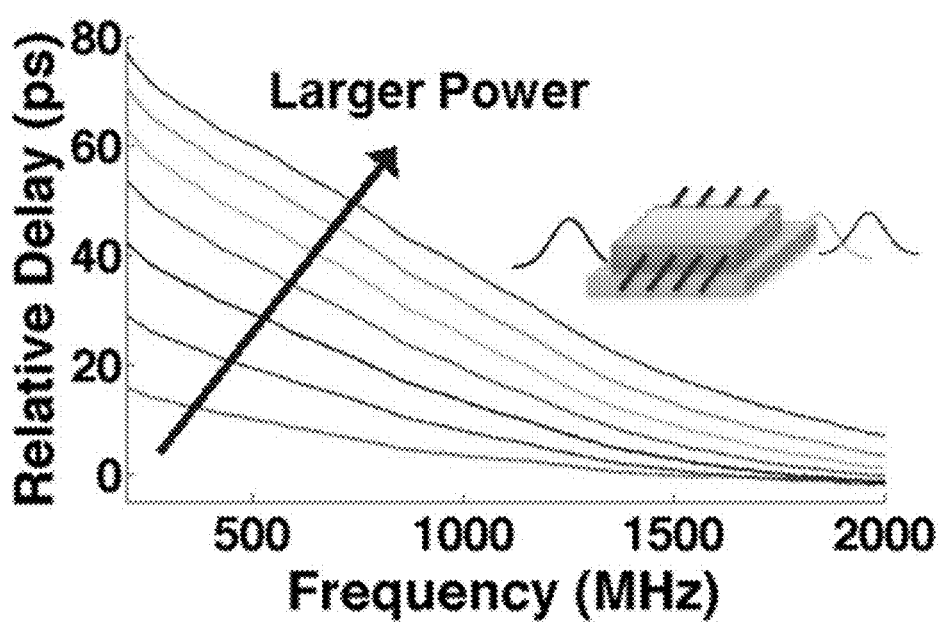
FIG. 5B is a graph showing experimental results showing delay tuning using input optical power.
Figure 5C:
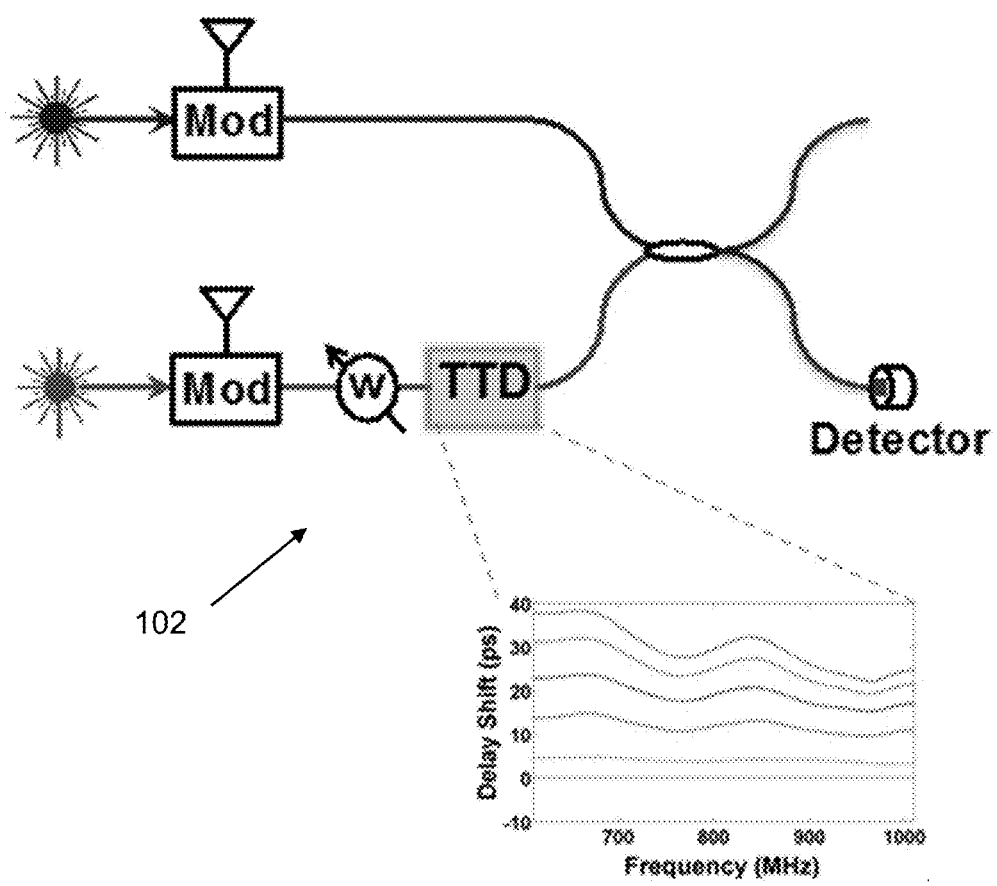
FIG. 5C is a diagram showing the TTD used in an optical interference cancellation system.
Figure 5D:
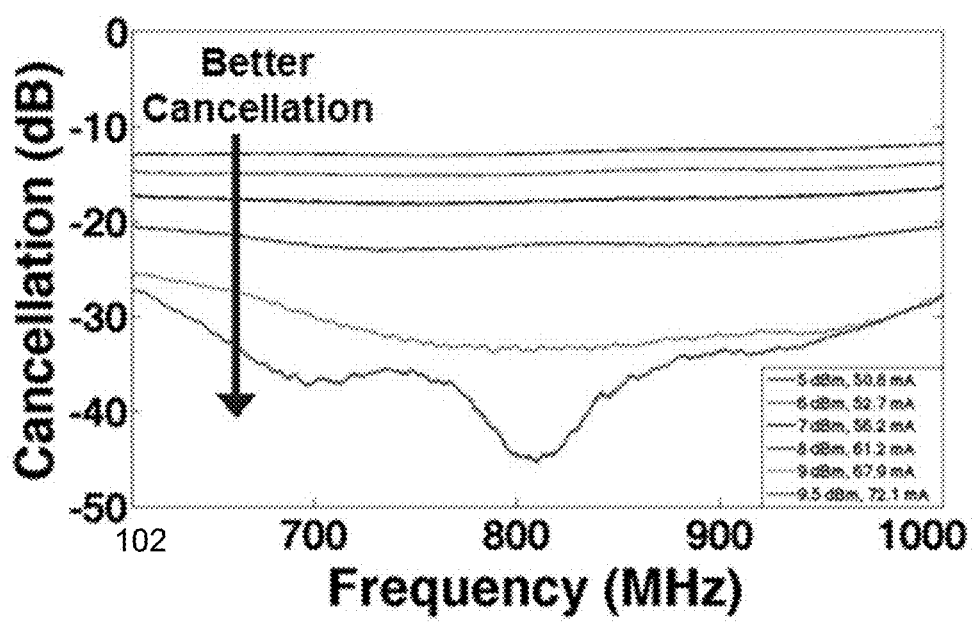
FIG. 5D is a graph showing how the TTD is used to dynamically adjust the delay of the interference copy to converge to an interference minimum.

Several photonic filters and interference cancellation systems were built using the slow light TTD to validate the technology. These filters are the fundamental building blocks of the beamformer. FIG. 5A shows the actual commercial SOA 100 used as the slow and fast light TTD. FIG. 5B shows experimental results using just a single channel of delay vs. RF frequency for different input optical powers (optical powers ranged from 2 dBm to 14 dBm). A maximum delay of 80 ps is demonstrated, which corresponds to an effective length of 8 mm in the material. This is eight times larger than the actual length of the device (1 mm), showing the TTD's ability to produce delays larger than its physical size. FIG. 5C shows a photonic self-interference cancellation system, which incorporates the TTD. Interference is cancelled by delaying, weighting, and inverting a copy of the interference before adding it back to itself. The TTD is used to dynamically adjust the delay of the interference copy to converge to an interference minimum, as shown in FIG. 5D. The TTD uses picosecond delay precision to reduce interference by 40 dB across ~40 MHz bandwidth. This is a direct demonstration of the precision and wide bandwidth of optics. Note again that FIG. 5C is essentially one branch of the full photonic beamformer.

Figure 6A:
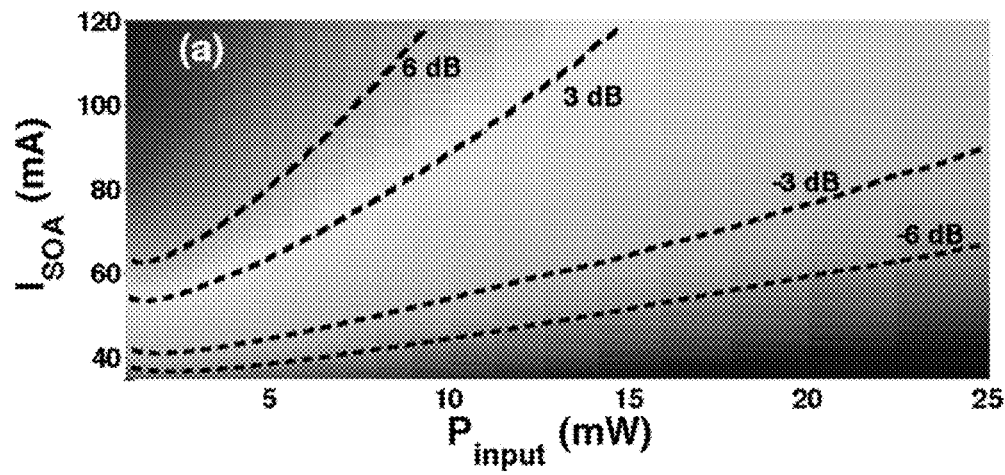
FIG. 6A is a graph showing mapping of a signal gain as functions of SOA bias current ($I_{SOA}$) and input optical power ($P_{input}$)
Figure 6B:
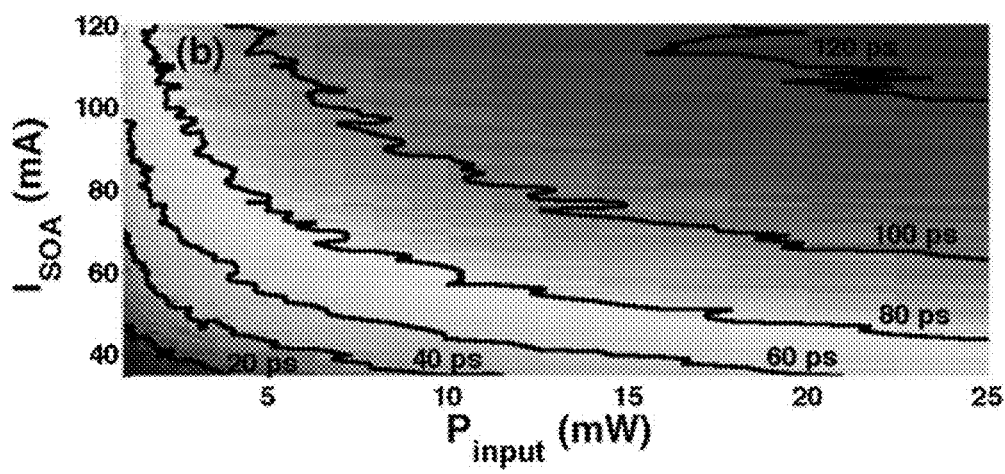
FIG. 6B is a graph showing mapping of a delay as functions of SOA bias current ($I_{SOA}$) and input optical power ($P_{input}$).

To determine how the TTD signal delay is controlled by the input optical power in the SOA, FIGS. 6A and 6B are graphs showing the signal gain and delay (of a 600 MHz RF signal) respectively as a function of the input optical power and SOA bias current. Because SOA bias current cannot be varied (because it affects all channels), only input optical power can be used as the control parameter. This can be interpreted in FIGS. 6A and 6B as horizontal lines extending from the SOA bias current axis (y-axis). Using this mapping, one can easily account for the delay and amplitude changes induced by varying the input optical power. Storing this mapping in memory and operating it as a look-up table is one way to adjust for the input power change. To achieve the desired delay and weight, a control system would only need to adjust the input optical power and an output attenuator based on a fixed look-up table. Therefore, each signal in the beamformer would need two control parameters. This is no more complicated than any other beamformer, which needs two control parameters—one for weight and one for delay. One might also consider alternative schemes, such as steepest-descent algorithms, which adjust the input optical power to move down a gradient, rather than using a look-up table. This technique may be more efficient than a look-up table depending on the application.

The beamformer's major power requirements come from the additional transceivers and amplifiers of a multi-antenna system. However, these transceivers and amplifiers are already in place in most base stations but are used for other purposes, such as sector antennas, MIMO, and single-beam beamforming. With these accounted for, the additional power-consuming hardware that a multi-beam beamformer brings to the table are the optical amplifiers that are needed to appropriately weight and delay each beam (remember, the delay is controlled using input optical power). To estimate this power requirement, we briefly analyze an example 10×10 beamformer (10 antennas directing 10 separate beams). Such a system requires 100 optical amplifiers to weight and delay the system. Unlike RF amplifiers, these amplifiers operate with much lower powers. In our typical setups, they consume a maximum of ~100 mA, across 1.5 V, thus consuming ~150 mW. Therefore, 10 amplifiers will consume about 15 W of power. We do not predict that the additional DSP requirements of the beamformer will contribute an appreciable amount of power.

At a modern base station using LTE, WiMAX, UMTS, and HSPA technologies, the majority of power consumption typically comes from the cooling units (225 W), transceivers (100 W), amplifiers (~150 W), and DSP (100 W) as shown in Table 1 of M. Deruyck et al., "Model for power consumption of wireless access networks," *IET Sci. Meas. Technol.*, vol. 5, pp. 155-161 (2011) which is incorporated by reference herein as if fully set forth. Therefore, the additional 15 W from the optical signal processing in the multi-beam beamformer is a small fraction of the total power. The low cost of 15 W to upgrade a single-beam beamformer to a multi-beam beamformer using mostly the same hardware is a small price to pay for the additional capacity and flexibility gained.

The disclosed beamformer employs a multi-beam TTD which is controlled through an unconventional method, namely through the input optical power of the input signals. To successfully employ the device, it is necessary to analyze the effects of using input optical power as a control parameter and devise an effective scheme to implement it. The first direct effect of using the optical power as a control parameter is that it changes the output optical power as well as the signal delay. Because a beamformer's operation is sensitive to both the weight and delay of each of the signals emitting from each antenna, the change in signal power (i.e. weight) must also be taken into account. Adding an additional variable attenuator control stage at the output of the TTD is one possibility.

Further description of the disclosed device is included in U.S. Provisional Application No. 62/041,746, filed Aug. 26, 2014. Any references listed in the provisional application as well as the appended materials are also part of the application and are incorporated by reference in their entirety as if fully set forth herein.

It should be understood that many variations are possible based on the disclosure herein. Although features and elements are described above in particular combinations, each feature or element can be used alone without the other features and elements or in various combinations with or without other features and elements. The methods or techniques provided herein may be at least partially implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). Also—the method can handle higher dimensional problems (up to six or seven dimensions) in order to handle additional generality in the representation of the problem.

What is claimed is:

1. A photonic beamformer configured to receive a plurality of RF input signals from a plurality of antennas, the beamformer comprising:
   a plurality of optical modulators, each optical modulator being configured to modulate each of the RF input signals onto an optical carrier, each carrier having a different wavelength;
   a plurality of optical amplifiers, each optical amplifier being configured to vary the optical power of one optical carrier based on a weighting input and generate a weighted optical carrier;
   a plurality of multi-beam optical true-time delays (TTD), each TTD being configured to receive all of the weighted optical signals and generate a plurality of time delayed optical signals;
   a plurality of detectors configured to detect each of the plurality of time delayed optical carriers and generate an electrical signal that represents each of the plurality of received RF input signals; and
   at least one demultiplexer coupled between the optical modulators and the plurality of optical amplifiers to demultiplex the plurality of optical carriers into individual optical carriers.

2. The photonic beamformer of claim 1 wherein the optical amplifiers are semiconductor optical amplifiers (SOAs) configured to vary the optical power of one optical carrier based on a weighting input and generate a weighted optical carrier.

3. The photonic beamformer of claim 1 wherein the multi-beam optical TTDs are semiconductor optical amplifiers (SOAs) configured to receive all of the weighted optical carriers and generate a plurality time delayed optical signals.

4. The photonic beamformer of claim 1 further comprising at least one demultiplexer coupled between the multi-beam optical TTDs and the detectors to demultiplex the plurality of time delayed optical carriers into individual time delayed optical carriers.

5. A photonic beamformer configured to transmit a plurality of RF transmit signals from a plurality of antennas, the beamformer comprising:
   a plurality of optical modulators, each optical modulator being configured to modulate each of the RF input signals onto an optical carrier, each carrier having a different wavelength;
   a plurality of optical amplifiers, each optical amplifier being configured to vary the optical power of one optical carrier based on a weighting input and generate a weighted optical carrier;
   a plurality of multi-beam optical true-time delays (TTD), each TTD being configured to receive all of the weighted optical carriers and generate a plurality of time delayed optical signals;
   a plurality of detectors configured to detect each of the plurality of time delayed optical carriers and generate an electrical signal that represents each of the plurality of RF transmit signals; and
   at least one splitter coupled between the optical modulators and the plurality of optical amplifiers to split the plurality of optical carriers into individual optical carriers.

6. The photonic beamformer of claim 5 wherein the optical amplifiers are semiconductor optical amplifiers (SOAs) configured to vary the optical power of one optical carrier based on a weighting input and generate a weighted optical carrier.

7. The photonic beamformer of claim 5 wherein the multi-beam optical TTDs are semiconductor optical amplifiers (SOAs) configured to receive all of the weighted optical carriers and generate a plurality time delayed optical carriers.

8. A photonic beamformer configured to receive a plurality of RF input signals from a plurality of antennas, the beamformer comprising:
   a plurality of optical modulators, each optical modulator being configured to modulate each of the RF input signals onto an optical carrier, each carrier having a different wavelength;
   a plurality of optical amplifiers, each optical amplifier being configured to vary the optical power of one optical carrier based on a weighting input and generate a weighted optical carrier;
   a plurality of multi-beam optical true-time delays (TTD), each TTD being configured to receive all of the weighted optical signals and generate a plurality of time delayed optical signals;
   a plurality of detectors configured to detect each of the plurality of time delayed optical carriers and generate an electrical signal that represents each of the plurality of received RF input signals; and
   a signal processor configured for angle determination and weighting and delay determination coupled to the weighting input of each optical amplifier.

9. The photonic beamformer of claim 8 wherein the optical amplifiers are semiconductor optical amplifiers (SOAs) configured to vary the optical power of one optical carrier based on a weighting input and generate a weighted optical carrier.

10. The photonic beamformer of claim 8 wherein the multi-beam optical TTDs are semiconductor optical amplifiers (SOAs) configured to receive all of the weighted optical carriers and generate a plurality time delayed optical signals.

11. The photonic beamformer of claim 8 further comprising at least one demultiplexer coupled between the multi-beam optical TTDs and the detectors to demultiplex the plurality of time delayed optical carriers into individual time delayed optical carriers.

12. A photonic beamformer configured to transmit a plurality of RF transmit signals from a plurality of antennas, the beamformer comprising:

a plurality of optical modulators, each optical modulator being configured to modulate each of the RF input signals onto an optical carrier, each carrier having a different wavelength;

a plurality of optical amplifiers, each optical amplifier being configured to vary the optical power of one optical carrier based on a weighting input and generate a weighted optical carrier;

a plurality of multi-beam optical true-time delays (TTD), each TTD being configured to receive all of the weighted optical carriers and generate a plurality of time delayed optical signals;

a plurality of detectors configured to detect each of the plurality of time delayed optical carriers and generate an electrical signal that represents each of the plurality of RF transmit signals; and a signal processor configured for angle determination and weighting and delay determination coupled to the weighting input of each optical amplifier.

13. The photonic beamformer of claim 12 wherein the optical amplifiers are semiconductor optical amplifiers (SOAs) configured to vary the optical power of one optical carrier based on a weighting input and generate a weighted optical carrier.

14. The photonic beamformer of claim 12 wherein the multi-beam optical TTDs are semiconductor optical amplifiers (SOAs) configured to receive all of the weighted optical carriers and generate a plurality time delayed optical carriers.

\* \* \* \* \*